US012148341B2

(12) United States Patent
Kim et al.

(10) Patent No.: US 12,148,341 B2
(45) Date of Patent: Nov. 19, 2024

(54) DISPLAY DRIVING CIRCUIT AND METHOD OF OPERATING SAME

(71) Applicant: SAMSUNG ELECTRONICS CO., LTD., Suwon-si (KR)

(72) Inventors: Wonseok Kim, Seongnam-si (KR); Woonyoung Lee, Seongnam-si (KR); Yeongshin Jang, Gwacheon-si (KR)

(73) Assignee: SAMSUNG ELECTRONICS CO., LTD., Suwon-si Gyeonggi-do (KR)

( * ) Notice: Subject to any disclaimer, the term of this patent is extended or adjusted under 35 U.S.C. 154(b) by 0 days.

(21) Appl. No.: 18/241,177

(22) Filed: Aug. 31, 2023

(65) Prior Publication Data

US 2023/0410708 A1 Dec. 21, 2023

Related U.S. Application Data

(63) Continuation of application No. 17/589,997, filed on Feb. 1, 2022, now Pat. No. 11,769,436.

(30) Foreign Application Priority Data

Feb. 17, 2021 (KR) ........................ 10-2021-0021140
May 25, 2021 (KR) ........................ 10-2021-0066824

(51) Int. Cl.
*G09G 3/20* (2006.01)

(52) U.S. Cl.
CPC ....... *G09G 3/20* (2013.01); *G09G 2310/0275* (2013.01); *G09G 2310/08* (2013.01); *G09G 2330/021* (2013.01)

(58) Field of Classification Search
CPC ..... G09G 2310/027; G09G 2310/0275; G09G 2310/08; G09G 2330/021
See application file for complete search history.

(56) References Cited

U.S. PATENT DOCUMENTS

| | | | | |
|---|---|---|---|---|
| 7,522,147 | B2 | 4/2009 | Lin et al. | |
| 9,158,106 | B2 * | 10/2015 | Hagood | G09G 3/3433 |
| 9,262,974 | B2 | 2/2016 | Lee | |
| 9,947,282 | B2 | 4/2018 | Choi | |
| 2007/0103421 | A1 | 5/2007 | Sekine et al. | |
| 2016/0093260 | A1 | 3/2016 | Watsuda | |

(Continued)

FOREIGN PATENT DOCUMENTS

| | | | |
|---|---|---|---|
| KR | 10-2017-0015726 | A | 2/2017 |
| KR | 10-2122531 | B1 | 6/2020 |

*Primary Examiner* — Gerald Johnson
(74) *Attorney, Agent, or Firm* — Muir Patent Law, PLLC

(57) ABSTRACT

A display apparatus including a display driving circuit and a display panel is provided. The display driving circuit, connected to a display panel including a plurality of pixel groups, includes a controller configured to determine a driving order of each of the plurality of pixel groups in a first horizontal period and to generate image data and a selection signal in a first voltage range, a data driver configured to generate an image signal on the basis of the image data and to transfer the image signal to the plurality of data lines in the first horizontal period, a plurality of output pads respectively connected to the plurality of pixel groups through the plurality of data lines, and a data switching circuit configured to provide the image signal to the display panel through at least one of the plurality of output pads based on the selection signal.

17 Claims, 13 Drawing Sheets

(56) References Cited

U.S. PATENT DOCUMENTS

| | | | |
|---|---|---|---|
| 2016/0322008 | A1 | 11/2016 | Sang et al. |
| 2017/0061928 | A1 | 3/2017 | Kim |
| 2018/0075817 | A1 | 3/2018 | Kim et al. |
| 2019/0156725 | A1 | 5/2019 | Hsu et al. |
| 2019/0180672 | A1 | 6/2019 | Knez et al. |
| 2020/0105204 | A1 | 4/2020 | Choe et al. |
| 2020/0161409 | A1 | 5/2020 | Sugisawa et al. |
| 2020/0184871 | A1 | 6/2020 | Hong et al. |

* cited by examiner

DISPLAY DRIVING CIRCUIT AND METHOD OF OPERATING SAME

CROSS-REFERENCE TO RELATED APPLICATIONS

This is a continuation application based on pending application Ser. No. 17/589,997, filed Feb. 1, 2022, the entire contents of which is hereby incorporated by reference.

This application is based on and claims priority under 35 U.S.C. § 119 to Korean Patent Applications No. 10-2021-0021140, filed on Feb. 17, 2021, and No. 10-2021-0066824, filed on May 25, 2021, in the Korean Intellectual Property Office, the disclosures of which are incorporated by reference herein in their entirety.

BACKGROUND

1. Field

Embodiments relate to a display apparatus, and more particularly, to a display apparatus including a display driving circuit and a display panel.

2. Description of the Related Art

Display panels may include a thin film transistor (TFT) which uses amorphous silicon or polycrystalline silicon as a semiconductor layer. Amorphous silicon is low in electron mobility and a channel resistance of a TFT is high, and due to this, a signal transfer speed may decrease, causing a reduction in efficiency. Polycrystalline silicon is higher in electron mobility than amorphous silicon, but is still lower in electron mobility and homogeneity than single crystal silicon. Therefore, in a case where a TFT of a display panel is used as a switch, panel power consumption may increase, a switching speed may be low, and a threshold voltage distribution difference of the TFT may occur, causing a mura defect.

SUMMARY

Embodiments are directed to a display driving circuit for driving a display panel that includes a plurality of pixel groups, the display driving circuit including: a controller configured to determine a driving order of each of the plurality of pixel groups in a first horizontal period, and to generate image data and a selection signal in a first voltage range; a data driver configured to generate an image signal on the basis of the image data from the controller, the data driver including a plurality of driving units configured to transfer the image signal to a plurality of data lines in the first horizontal period; a plurality of output pads respectively connected to the plurality of pixel groups through the plurality of data lines; and a data switching circuit configured to provide the image signal to the display panel through at least one of the plurality of output pads on the basis of control based on the selection signal.

Embodiments are directed to a display apparatus including a display panel connected to a display driving circuit, the display apparatus including: a plurality of input pads on the display panel, the plurality of input pads being respectively connected to a plurality of data lines and configured to time-divisionally receive an image signal from the display driving circuit through the plurality of data lines in a first horizontal period; and a plurality of pixel groups arranged in the display panel, and respectively connected to the plurality of input pads and driven based on receiving the image signal.

Embodiments are directed to a display apparatus, including: a display driving circuit, including: a plurality of output pads; a controller configured to generate image data and a selection signal; a data driver configured to generate an image signal on the basis of the image data, the data driver including a plurality of driving units configured to respectively drive a plurality of data lines in a first horizontal period; and a data switching circuit including a plurality of switches respectively connected to the plurality of driving units, the data switching circuit being configured to output the image signal through the plurality of output pads on the basis of control based on the selection signal so as to time-divisionally control the plurality of switches in the first horizontal period; and a display panel, including: a plurality of input pads configured to receive the image signal; and a plurality of pixel groups respectively connected to the plurality of input pads and selectively driven based on the image signal.

BRIEF DESCRIPTION OF THE DRAWINGS

Features will become apparent to those of skill in the art by describing in detail example embodiments with reference to the attached drawings in which.

DETAILED DESCRIPTION

Figure 1:
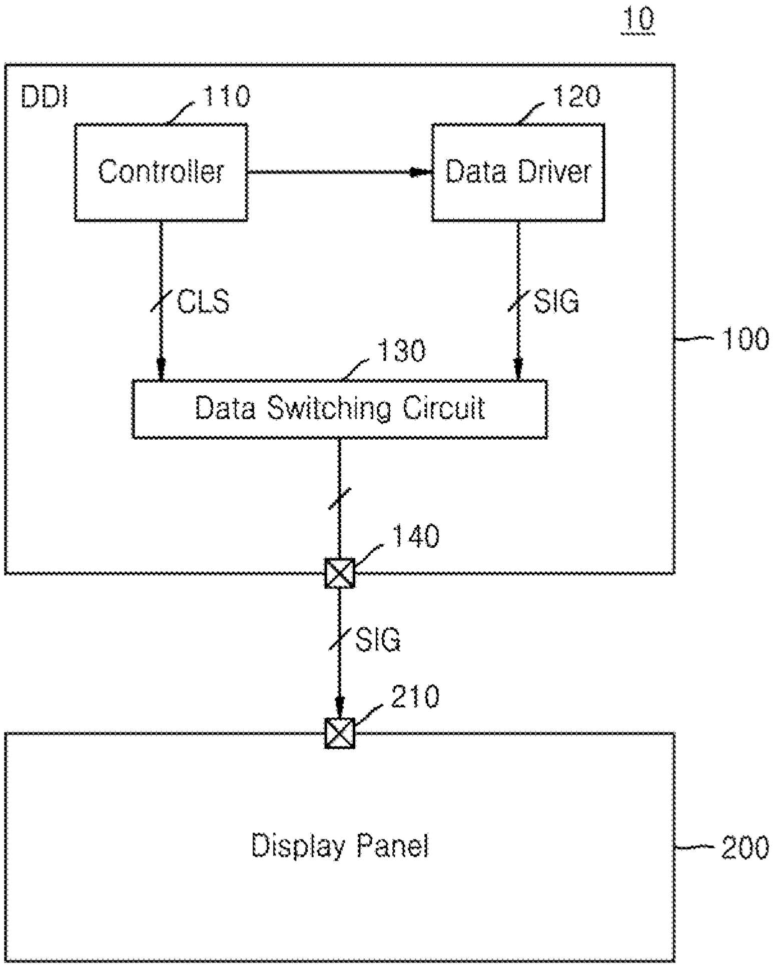
FIG. 1 is a block diagram illustrating a portion of a display apparatus according to an example embodiment.

FIG. 1 is a block diagram illustrating a portion of a display apparatus 10 according to an example embodiment.

Referring to FIG. 1, the display apparatus 10 may include a display driving circuit 100 and a display panel 200.

Examples of the display apparatus 10 include an electronic device including an image display function. For example, the electronic device may be or include a smartphone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD), electronic clothes, electronic braces, an electronic necklace, an electronic accessory, an electronic tattoo, a smart watch, etc.), etc. Examples of the display apparatus 10 may include a smart home appliance having an image display function.

The display panel 200 may include a plurality of pixel groups, and each of the pixel groups may include a plurality of pixels. For example, pixels connected to one data line may be included in one pixel group. Details will be described below with reference to FIG. 2.

The display panel 200 may include a plurality of input pads 210. The display panel 200 may receive an image signal SIG from the display driving circuit 100 through the plurality of input pads 210. The plurality of input pads 210 may be respectively connected to a plurality of data lines and may be respectively connected to a plurality of output pads 140 of the display driving circuit 100.

The display driving circuit 100 may include a controller 110, a data driver 120, a data switching circuit 130, and the plurality of output pads 140. The display driving circuit 100 may output the image signal SIG to the display panel 200 through the plurality of output pads 140.

The controller 110 may generate image data for displaying an image on the display panel 200. The controller 110 may provide the image data to the data driver 120. The controller 110 may generate a selection signal CLS for selectively driving the plurality of pixel groups of the display panel 200. The controller 110 may time-divisionally drive the plurality of pixel groups during one horizontal period. For example, the controller 110 may generate a first selection signal (for example, CLA of FIG. 2) for driving a first pixel group during a ½-horizontal period and may generate a second selection signal (for example, CLB of FIG. 2) for driving a second pixel group during a ½-horizontal period. The selection signal CLS may be a digital signal within a first voltage range. The first voltage range may be a middle voltage range. The controller 110 may provide the selection signal CLS to the data switching circuit 130.

The data driver 120 may convert the image data, received from the controller 110, into the image signal SIG on the basis of control by the controller 110. The image signal SIG may be an analog signal. The data driver 120 may provide the image signal SIG to the data switching circuit 130. The data driver 120 may include a plurality of driving units. Each of the plurality of driving units may be connected to some of the plurality of data lines, and may time-divisionally drive some of the data lines during one horizontal period. Details will be described below with reference to FIG. 3.

The data switching circuit 130 may receive the selection signal CLS from the controller 110 and may receive the image signal SIG from the data driver 120. The data switching circuit 130 may include a plurality of switches. The data switching circuit 130 may selectively drive the plurality of switches and may selectively output the image signal SIG, on the basis of the selection signal CLS. The plurality of switches may be turned on by the selection signal SIG within the first voltage range.

The data switching circuit 130 may be connected to the plurality of output pads 140. The plurality of output pads 140 may be respectively connected to the plurality of data lines, and may be respectively connected to the plurality of input pads 210 of the display panel 200 through the plurality of data lines. Therefore, the data switching circuit 130 may be connected to the plurality of pixel groups of the display panel 200.

The data switching circuit 130 may drive a switch and may time-divisionally output the image signal SIG, on the basis of the time-divisionally generated selection signal CLS. For example, in the data switching circuit 130, a first switch may be turned on based on the first selection signal received during a ½-horizontal period and may provide a first image signal to the first pixel group. A second switch may be turned on based on the second selection signal received during a ½-horizontal period and may provide a second image signal to the second pixel group. Hereinafter, details of the data switching circuit 130 will be described with reference to FIG. 3.

The display driving circuit 100 may sequentially provide the image signal SIG to each of the plurality of pixel groups during one horizontal period. The data switching circuit 130 may be selectively provided the image signal SIG, and may be included in the display driving circuit 100. The selection signal CLS for driving the data switching circuit 130 may be within the first voltage range used in the display driving circuit 100. The switches included in the display panel 200 may be turned on by a signal corresponding to a second voltage range, and the second voltage range may be a high voltage range, and may be a range that is higher than the first voltage range. The selection signal CLS may not be transferred to the display panel 200, and thus an operation of changing the selection signal CLS from the first voltage range to the second voltage range may be omitted.

The display driving circuit 100 may be included in a substrate including single crystal silicon, and the display panel 200 may be provided on a substrate including polycrystalline silicon or amorphous silicon. The data switching circuit 130 may be included in the display driving circuit 100, and thus an operation speed may increase by using a thin film transistor (TFT), including single crystal silicon, as a switch. Also, power consumed by the display driving circuit 100 may be reduced.

Also, input/output (I/O) pads and patterns for providing the selection signal CLS to the display panel 200 may be omitted, and the display panel 200 may not include the data switching circuit 130. Therefore, a bezel or a dead space of the display panel 200 may be minimized, and the degree of freedom in design of the display panel 200 may increase.

Figure 2:
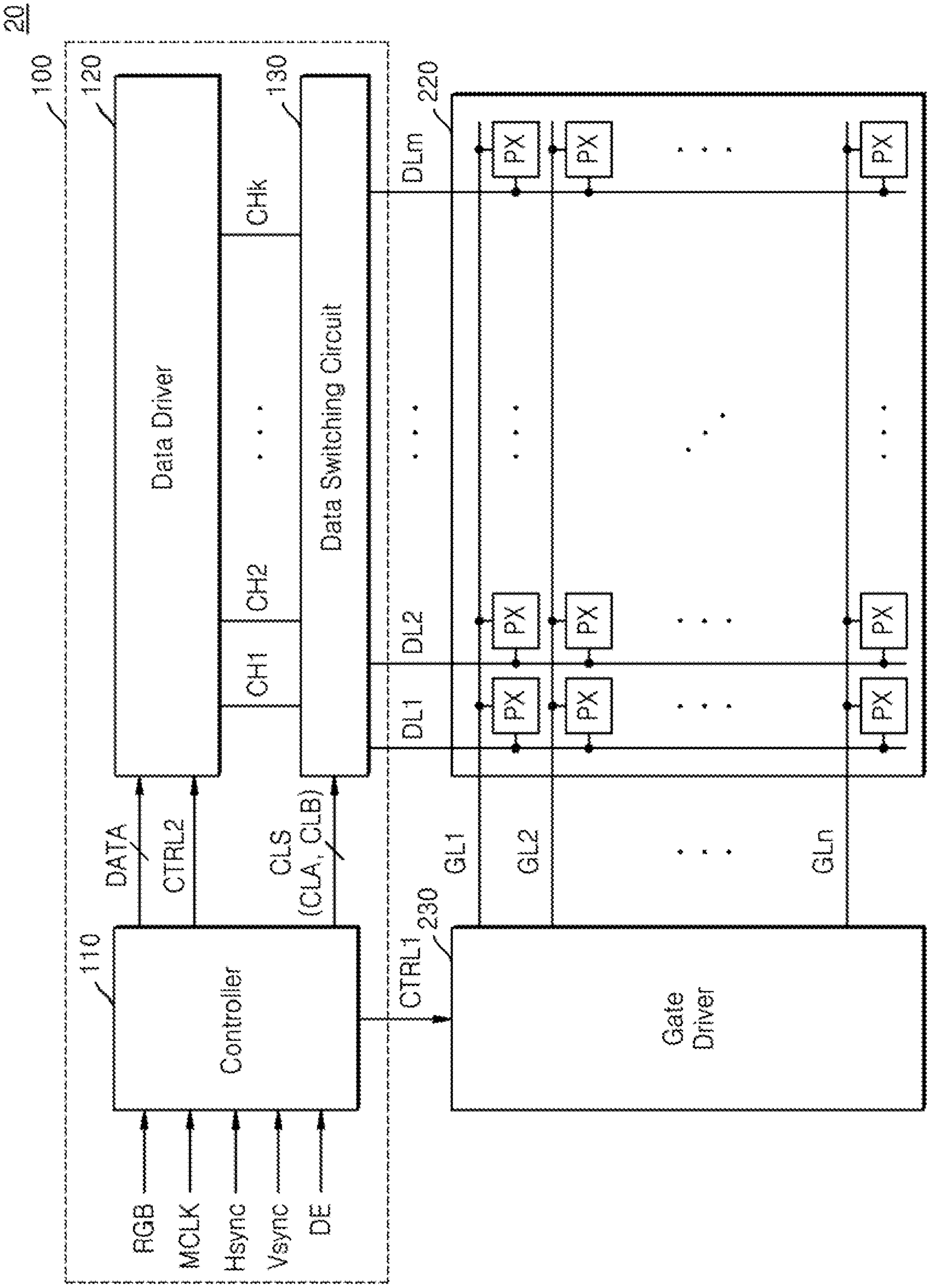
FIG. 2 is a block diagram illustrating a display apparatus according to an example embodiment.

FIG. 2 is a block diagram illustrating a display apparatus 20 according to an example embodiment. The display apparatus 20 may correspond to an embodiment of the display apparatus 10 of FIG. 1.

Referring to FIG. 2, the display apparatus 20 may include a controller 110, a data driver 120, a data switching circuit 130, a gate driver 230, and a display panel 220. The controller 110, the data driver 120, and the data switching circuit 130 may be included in the display driving circuit 100. The gate driver 230 may be provided in the display panel 220.

The display panel 220 may include a plurality of pixels PX arranged in a matrix form, and may display an image by frame units. The display panel 220 may be implemented as, e.g., a liquid crystal display (LCD), a light-emitting diode (LED) display, an organic light-emitting diode (OLED) display, an active-matrix OLED (AMOLED) display, an electrochromic display (ECD), a digital mirror device (DMD), an actuated mirror device (AMD), a grating light valve (GLV), a plasma display panel (PDP), an electroluminescent display (ELD), a vacuum fluorescent display (VFD), various other flat panel displays or flexible displays, etc. Hereinafter, an OLED panel will be described as an example.

The display panel 220 may include a plurality of gate lines GL1 to GLn arranged in a row direction, a plurality of data lines DL1 to DL arranged in a column direction, and a plurality of pixels PX provided at intersection points between the plurality of gate lines GL1 to GLn and the plurality of data lines DL1 to DL. The display panel 220 may include a plurality of horizontal lines, and one horizontal line may include pixels PX connected to one gate line. Pixels PX of one horizontal line may be driven during a horizontal period, and during a next horizontal period, pixels PX of another horizontal line may be driven. One horizontal period may be referred to as a horizontal (1H) period.

In the display panel 220, pixels PX (hereinafter referred to as a red pixel, a green pixel, and a blue pixel) emitting red (R) light, green (G) light, and blue (B) light may be repeatedly arranged. The pixels PX may be arranged repeatedly in the order of R, G, and B, or B, G, and R. An arrangement structure of the pixels PX may be referred to as an RGB stripe structure. In another implementation, the pixels PX may be arranged repeatedly in the order of R, G, B, and G, or B, G, R, and G. An arrangement structure of the pixels PX may be referred to as a pentile structure. In the display panel 220 having the pentile structure, the pixels PX may include odd lines arranged in the order of R, G, B, and G, and even lines arranged in the order of B, G, R, and G.

The pixels PX may include an LED and a driving circuit that independently drives the LED. For example, each of the pixels PX may include a diode driving circuit, connected to one gate line and data line, and the LED connected between the diode driving circuit and a source voltage (for example, a ground voltage).

The diode driving circuit may include a switching element (for example, a TFT) connected to a gate line. When the switching element is turned on by a gate-on signal applied through the gate line, the diode driving circuit may supply the LED with an image signal received through a data line connected to the diode driving circuit. The LED may output a light signal corresponding to the image signal.

The gate driver 230 may sequentially supply the gate-on signal to the gate lines GL1 to GLn in response to a gate control signal CTRL1. For example, the gate control signal CTRL1 may include a gate start pulse GSP, indicating the output start of the gate-on signal, and a gate shift clock GSC, which controls an output time of the gate-on signal. When the gate start pulse GSP is applied, the gate driver 230 may sequentially generate the gate-on signal (for example, a gate voltage having a logic low level) and may sequentially supply the gate-on signal to the gate lines GL1 to GLn, in response to the gate shift clock GSC. At this time, in a period where the gate-on signal is not supplied to the gate lines GL1 to GLn, a gate-off signal (for example, a gate voltage having a logic high level) may be supplied to the gate lines GL1 to GLn.

The data driver 120 may convert image data DATA into image signals (for example, a grayscale voltage corresponding to pixel data), and may output the image signals to a plurality of channels CH1 to CHk, in response to a data control signal CTRL2. For example, the data control signal CTRL2 may include a source start signal (SSP), a source shift clock (SSC), and a source output enable (SOE) signal. The data driver 120 may include a plurality of driving units which provide an image signal corresponding to one horizontal line to the data lines DL1 to DLm during one horizontal period. Each of the plurality of driving units may activate data lines connected thereto.

The data switching circuit 130 may include a plurality of multiplexer circuits configured with a plurality of switches. Each of the plurality of switches may be controlled by a signal within the first voltage range. The data switching circuit 130 may sequentially connect each of the plurality of channels CH1 to CHk to at least two data lines on the basis of selection signals CLS input from the controller 110. The data switching circuit 130 may sequentially select a plurality of pixel groups on the basis of the selection signals CLS. Therefore, during one horizontal period, image signals output from the data driver 120 may be sequentially provided to at least two pixel groups through the data switching circuit 130.

The controller 110 may receive a control signal (for example, a horizontal synchronization signal Hsync, a vertical synchronization signal Vsync, a clock signal DCLK, and a data enable signal DE) from the outside (for example, a host device (not shown)) and may generate control signals CONT1, CONT2, and CLS for controlling the gate driver 230, the data driver 120, and the data switching circuit 130. Various operation timings of the gate driver 230, the data driver 120, and the data switching circuit 130 may be controlled based on the control signals CONT1, CONT2, and CLS.

The controller 110 may receive image data RGB from the outside and may perform image processing on the received image data RGB, or may convert the image data RGB so as to match a structure of the display panel 220. The controller 110 may transfer converted image data DATA to the data driver 120.

The controller 110 may determine a driving order of pixel groups of one horizontal line of the display panel 220. For example, the controller 110 may temporally divide one horizontal period to drive each of the plurality of pixels.

The controller 110 may generate a plurality of selection signals for controlling an order in which the plurality of pixel groups are driven. The plurality of selection signals may be within the first voltage range. The selection signals CLS may include a first selection signal CLA and a second selection signal CLB. A first pixel group may be selected in response to the first selection signal CLA, and a second pixel group may be selected in response to the second selection signal CLB. The controller 110 may generate the first selection signal CLA and the second selection signal CLB for driving the first pixel group and the second pixel group for each horizontal line. As a selection signal is generated, a switch receiving the selection signal may be turned on.

Although not shown, the display apparatus 20 may further include a voltage generating circuit and an interface. The voltage generating circuit may generate various kinds of voltages used in the display panel 220 and driving circuits. For example, the voltage generating circuit may generate voltages of the first voltage range used in the display driving circuit 100 and may generate voltages of the second voltage range used in the display panel 220. For example, the first voltage range may include a low voltage range and/or a middle voltage range, and the second voltage range may include a high voltage range. The interface may include, e.g., an RGB interface, a central processing unit (CPU) interface, a serial interface, a mobile display digital interface (MDDI), an inter integrated circuit (I2C) interface, a serial peripheral interface (SPI), a micro controller unit (MDU) interface, a mobile industry processor interface (MIPI), an embedded display port (eDP) interface, a D-subminiature (D-sub) interface, an optical interface 4076, a high definition multimedia interface (HDMI), various serial or parallel interfaces, etc.

The controller 110, the data driver 120, and the data switching circuit 130 may be implemented in one semiconductor chip, e.g., as the display driving circuit 100, whereas the gate driver 230 may be integrated into the display panel 220. The semiconductor chip for the display driving circuit

100 may include a semiconductor substrate including single crystal silicon, and thus the display driving circuit 100 may include a driving element and/or a switch, which are/is configured with a single crystal silicon TFT. The display panel 220 may include a semiconductor substrate including amorphous silicon (a-Si) or polycrystalline silicon (poly-Si), and thus the display panel 220 may include a driving element and/or a switch, which are/is configured with an a-Si TFT, or may include a driving element and/or a switch, which are/is configured with a poly-Si TFT.

A pad or pads may be provided for connecting the data switching circuit 130 to the display panel 220. For example, the data switching circuit 130 may include a plurality of output pads, and the display panel 220 may include a plurality of input pads. Each of a plurality of patterns that connect the plurality of output pads to the plurality of input pads may be referred to as a data line. The number of output pads, the number of input pads, and the number of data lines may be the same.

Figure 3:
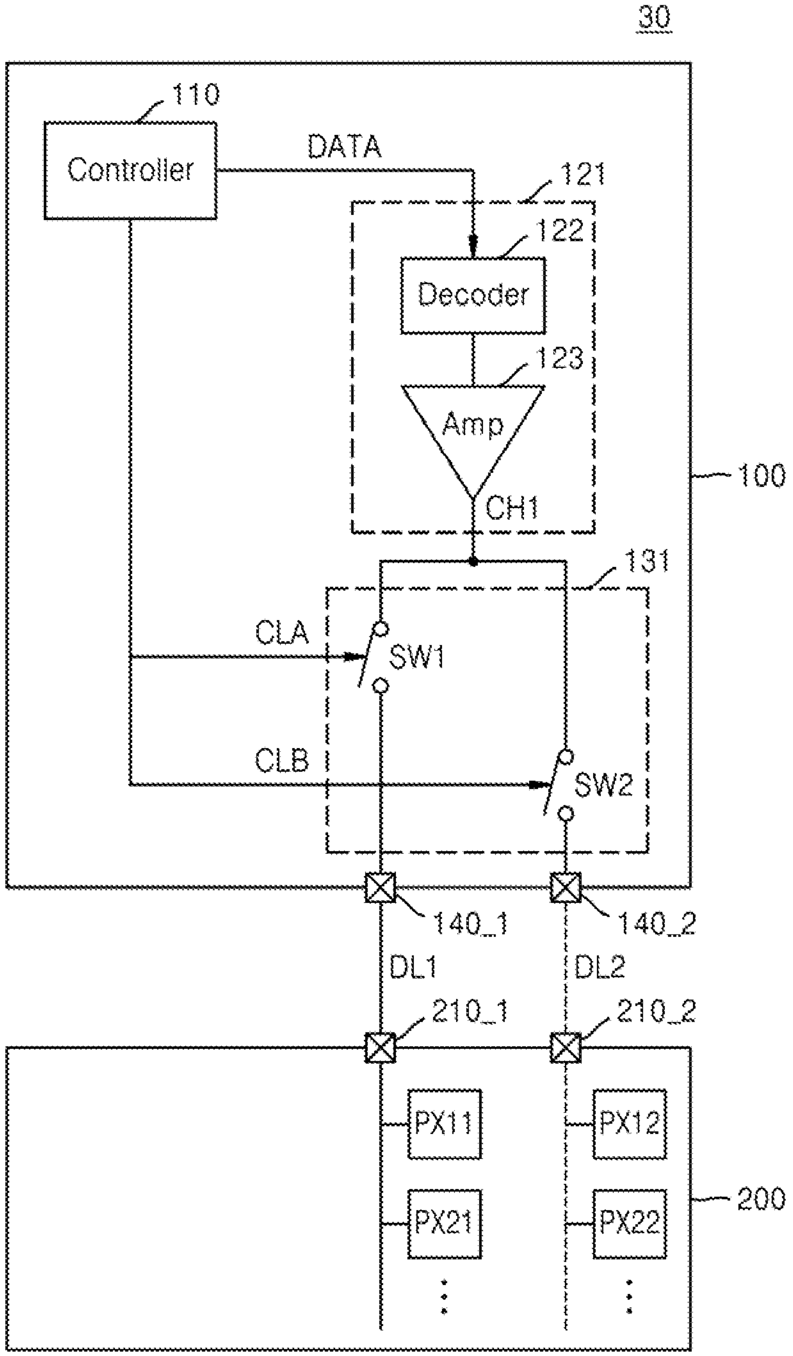
FIG. 3 is an example diagram illustrating a display apparatus according to an example embodiment.

FIG. 3 is an example diagram illustrating a display apparatus according to an example embodiment. A display driving circuit 100 and a display panel 200 of FIG. 3 may correspond to an embodiment of the display driving circuit 100 and the display panel 200 each described above with reference to FIGS. 1 and 2.

Referring to FIG. 3, the display driving circuit 100 may include a controller 110, a data driver 120, a data switching circuit 130, and a plurality of output pads 140_1 and 140_2.

The data driver 120 may include a plurality of driving units including a first driving unit 121.

The data switching circuit 130 may include a plurality of multiplexers including a first multiplexer 131.

The plurality of output pads 140_1 and 140_2 may include first and second output pads 140_1 and 140_2.

Hereinafter, the first driving unit 121, the first multiplexer 131, and the first and second output pads 140_1 and 140_2 will be described as an example.

The first driving unit 121 may include a decoder 122 and a channel amplifier 123, and may convert received image data DATA into an image signal SIG and output the image signal SIG through a first channel CH1.

The decoder 122 may receive a plurality of gamma voltages (not shown) and data DATA and may select and output a gamma voltage corresponding to the image data DATA from among the plurality of gamma voltages.

The channel amplifier 123 may output a gamma voltage, received from the decoder 122, as the image signal SIG. The channel amplifier 123 may output the image signal SIG through a corresponding channel (for example, the first channel CH1).

The channel amplifier 123 may be connected to first and second data lines DL1 and DL2, and thus, the first driving unit 121 may control driving of the first and second data lines DL1 and DL2. The first driving unit 121 may sequentially drive the first and second data lines DL1 and DL2 in one horizontal period.

The first multiplexer 131 may include first and second switches SW1 and SW2. The first switch SW1 may connect the first channel CH1 to the first data line DL1, and the second switch SW2 may connect the first channel CH1 to the second data line DL2. The first and second switches SW1 and SW2 may be respectively turned on by first and second selection signals CLA and CLB. As a switch is turned on, a data line connected to the switch may be driven. The first switch SW1 may be turned on by the first selection signal CLA to drive the first data line DL1. The second switch SW2 may be turned on by the second selection signal CLB to drive the second data line DL2. The first and second selection signals CLA and CLB may be within the first voltage range. The first and second selection signals CLA and CLB may be respectively provided to the first and second switches SW1 and SW2 in a state in which the first voltage range is maintained. The first multiplexer 131 may be connected to each of the first and second data lines DL1 and DL2 through the first and second output pads 140_1 and 140_2.

As a data line is driven, the image signal SIG may be provided to pixel groups connected to the data line. For example, as the first data line DL1 is driven, first and second pixels PX11 and PX21 included in a first pixel group may be driven, and as the second data line DL2 is driven, third and fourth pixels PX12 and PX22 included in a second pixel group may be driven.

The display panel 200 may include first and second input pads 210_1 and 210_2, the first pixel group including first pixel PX11 and second pixel PX21, and the second pixel group including third pixel PX12 and fourth pixel PX22.

The first pixel group (including first and second pixels PX11 and PX21) may be connected to the first data line DL1 through the first input pad 210_1, and may receive the image signal SIG from a driving unit. The second pixel group (including third and fourth pixels PX12 and PX22) may be connected to the second data line DL2 through the second input pad 210_2, and may receive the image signal SIG from the driving unit.

The first pixel PX11 (of the first pixel group) and the third pixel PX12 (of the second pixel group) may be driven in a first horizontal period. The second pixel PX21 (of the first pixel group) and the fourth pixel PX22 (of the second pixel group) may be driven in a second horizontal period.

The display panel 200 may be implemented with, e.g., a pentile structure, in which case the arrangement of the first, second, third, and fourth pixels PX11, PX21, PX12, and PX22 may correspond to one of (R, B, G, G), (B, R, G, G), (G, G, R, B), and (G, G, B, R).

The display driving circuit 100 may further include a second driving unit (not shown), third and fourth switches (not shown) connected to the second driving unit, a third data line (not shown) connecting a third switch to a third pixel group, and a fourth data line (not shown) connecting a fourth switch to a fourth pixel group. The third and fourth switches may be respectively driven by the first and second selection signals CLA and CLB, and the first and third pixel groups may be driven in a division horizontal period where the first selection signal CLA is generated. The second and fourth pixel groups may be driven in a division horizontal period where the second selection signal CLB is generated.

Figure 4:
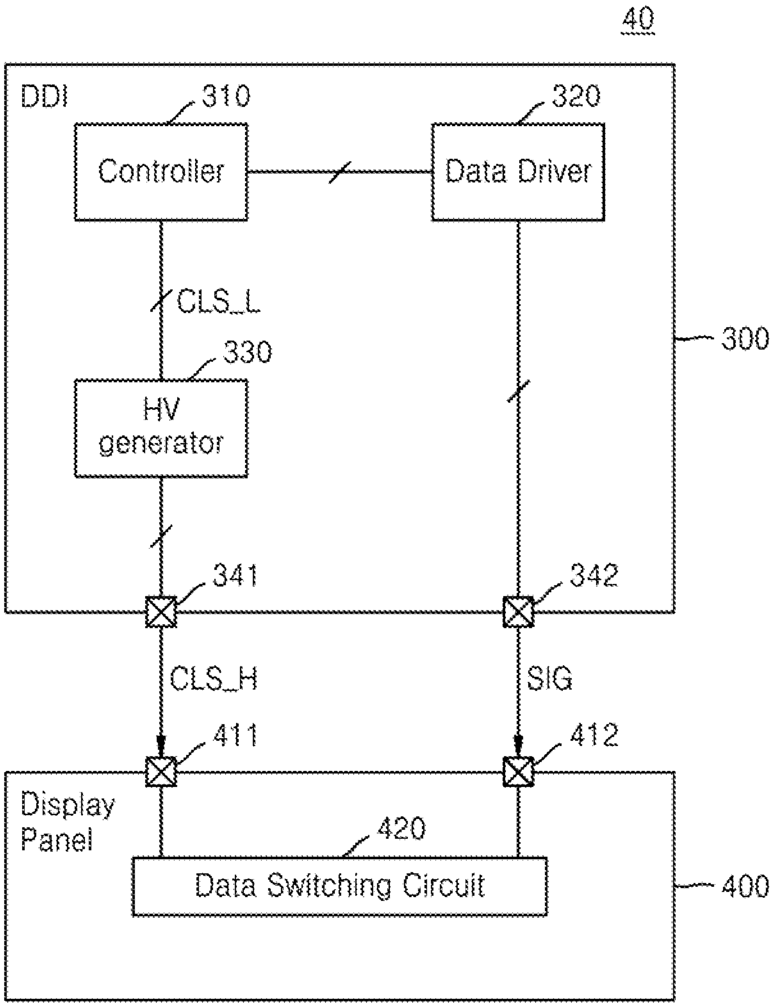
FIG. 4 is a block diagram illustrating a portion of a display apparatus according to a comparative example.

FIG. 4 is a block diagram illustrating a portion of a display apparatus 40 according to a comparative example.

Referring to FIG. 4, the display apparatus 40 according to the comparative example may include a display driving circuit 300 and a display panel 400.

The display driving circuit 300 according to the comparative example may include a high voltage generator 330, unlike the display driving circuit 100 described above with reference to FIGS. 1 to 3.

The display panel 400 according to the comparative example may include a data switching circuit 420, unlike the display panel 200 described above with reference to FIGS. 1 to 3.

The data switching circuit 420 may be driven by a selection signal CLS_H within the second voltage range. Therefore, the display driving circuit 300 may change a selection signal CLS_S, which is provided in the first voltage range, to the second voltage range, and may provide the selection signal CLS_H to the display panel 400. Therefore, the display apparatus 40 additionally includes a plurality of I/O pads 341, 342, 411, and 412 for providing the selection signal CLS_H. Further, power consumption may be increased due to inclusion of the high voltage generator 330 and the data switching circuit 420.

By comparison, the display driving circuit 100 according to an example embodiment includes the data switching circuit 130, and thus conversion of the selection signal CLS into a high voltage may be omitted, reducing power consumption. Also, in the display driving circuit 100 according to an example embodiment, an I/O pad for transferring the selection signal CLS may be omitted, and thus a bezel region of the display panel 200 according to an example embodiment may be reduced, enhancing the degree of freedom in design of the display apparatuses 10, 20, and 30 according to example embodiments.

Figure 5:
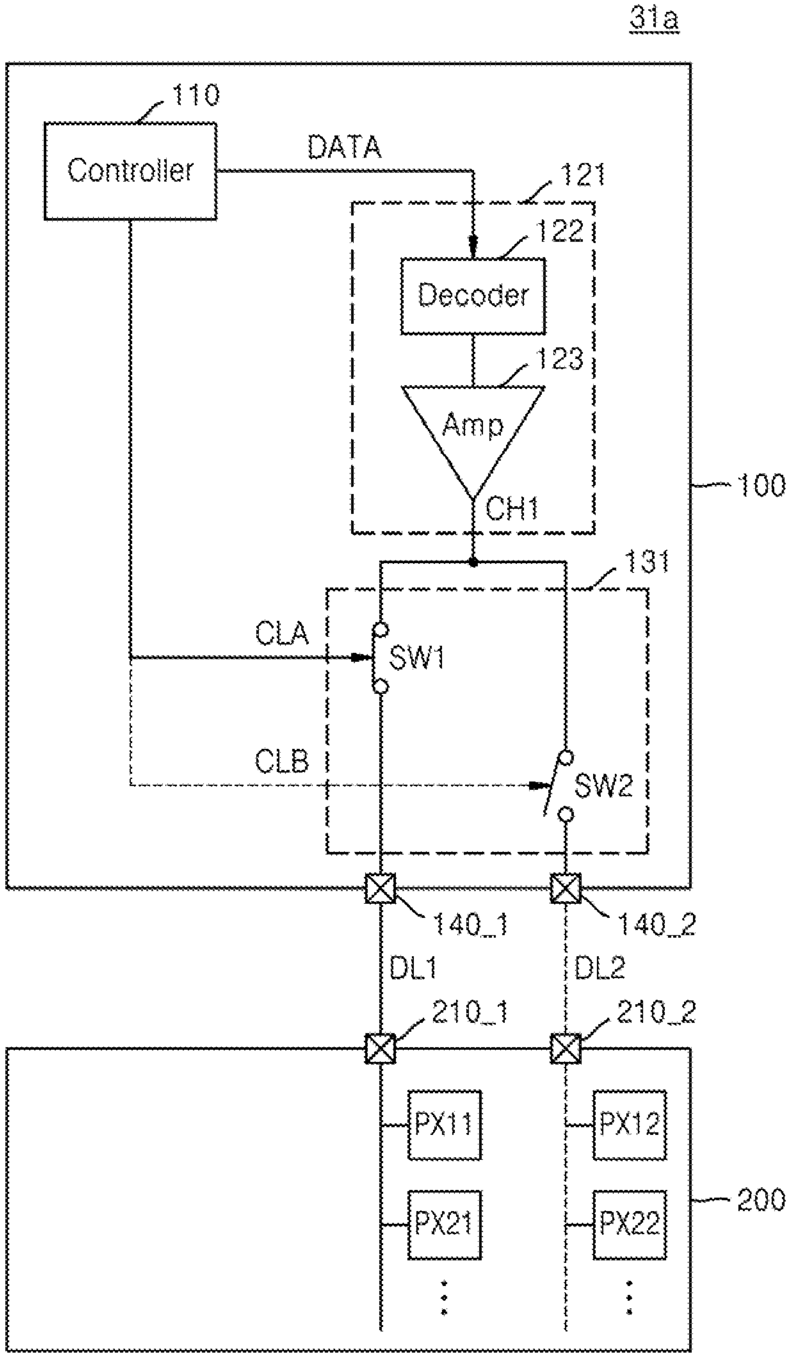
FIGS. 5 and 6 are example diagrams illustrating operation states of a display apparatus according to an example embodiment.
Figure 6:
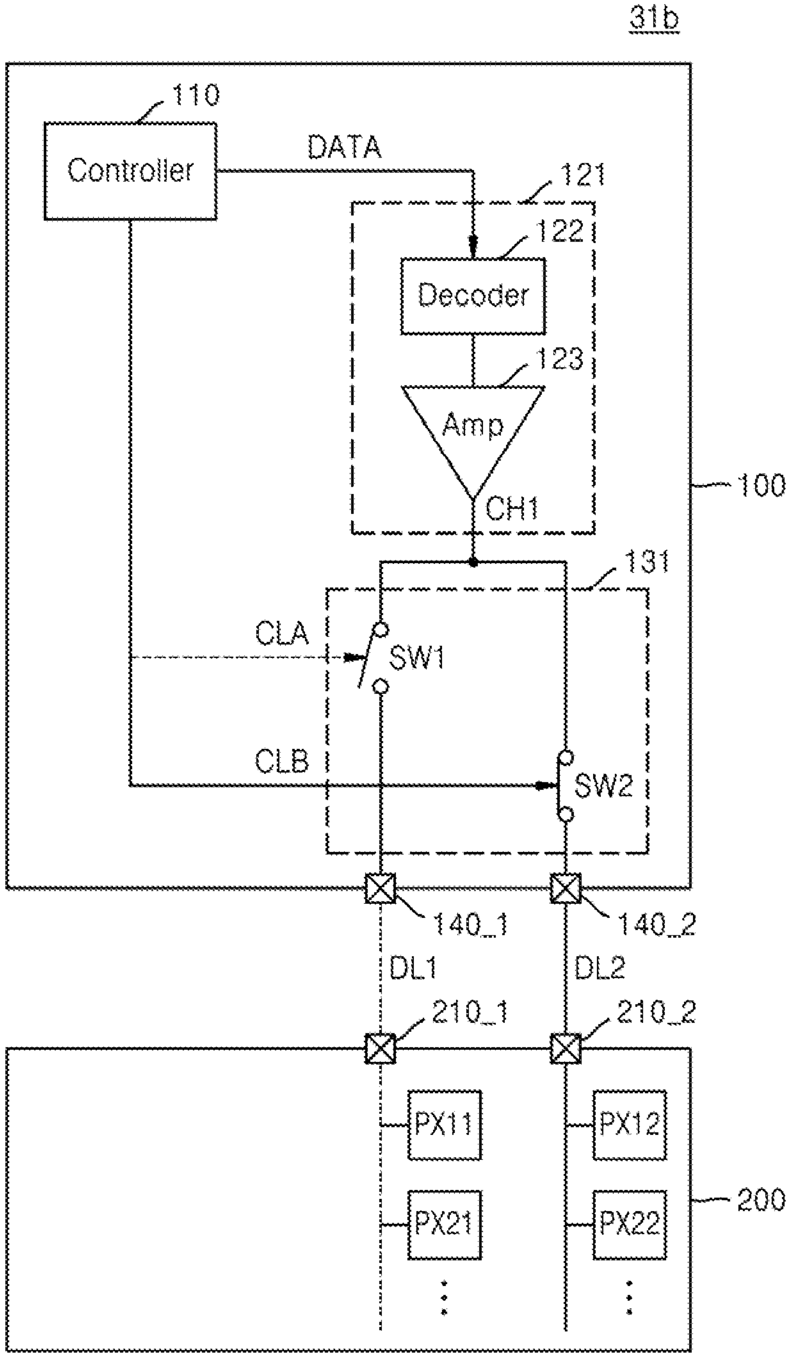
Figure 7:
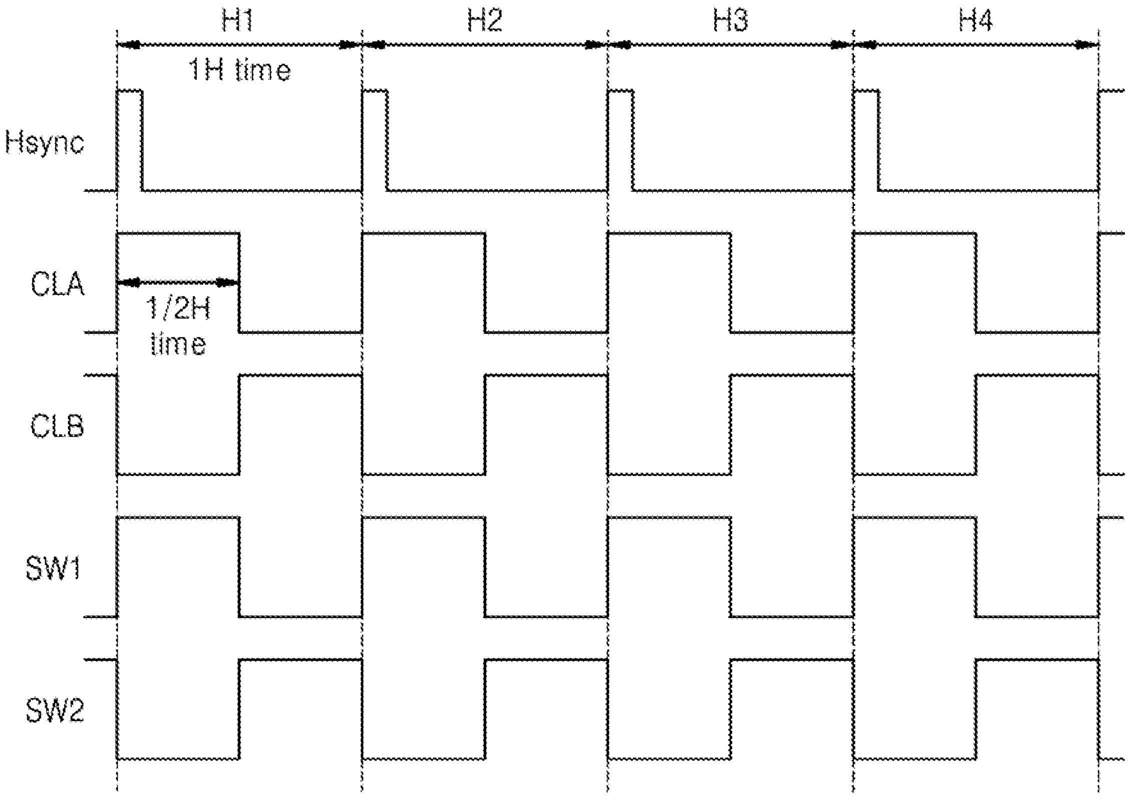
FIG. 7 is a timing diagram showing an operation of a data switching circuit according to an example embodiment.

FIGS. 5 and 6 are example diagrams illustrating operation states of a display apparatus according to an example embodiment, and FIG. 7 is a timing diagram showing an operation of a data switching circuit according to an example embodiment.

A horizontal period may denote a period of a horizontal synchronization signal Hsync.

One horizontal period may be divided into a plurality of division horizontal periods. By way of example, a first horizontal period H1 may include first and second division horizontal periods, each ½H in duration. The number of divisions of a horizontal period may be determined based on the number of data lines driven by a first driving unit 121.

By way of example, FIG. 5 illustrates a first operation state of a display apparatus (denoted 31*a*) in the first division horizontal period, and FIG. 6 illustrates a second operation state of the display apparatus (denoted 31*b*) in the second division horizontal period.

Referring to FIGS. 5 and 7, a controller 110 may generate a first selection signal CLA in the first division horizontal period such that a first switch SW1 may be turned on by the first selection signal CLA. Therefore, a channel amplifier 123 of the first driving unit 121 may output an image signal SIG to a first data line DL1. A first pixel group (including a first pixel PX11 and a second pixel PX21) may be activated based on driving of the first data line DL1. For example, the first pixel PX11 of the first pixel group may receive the image signal SIG and may be driven based on the image signal SIG.

Referring to FIGS. 6 and 7, the controller 110 may generate a second selection signal CLB in the second division horizontal period such that a second switch SW2 may be turned on by the second selection signal CLB. Therefore, the channel amplifier 123 of the first driving unit 121 may output the image signal SIG to a second data line DL2. A second pixel group (including a third pixel PX12 and a fourth pixel PX22) may be activated based on driving of the second data line DL2. For example, the third pixel PX12 of the second pixel group may receive the image signal SIG and may be driven based on the image signal SIG.

Referring to FIG. 7, operations described above may be periodically performed in first to fourth horizontal periods H1 to H4.

For example, the second horizontal period H2 may be divided into third and fourth division horizontal periods. In the third division horizontal period, the first selection signal CLA may be turned on, and thus, the channel amplifier 123 may output the image signal SIG to the third pixel through the first data line DL1. In the fourth division horizontal period, the second selection signal CLB may be turned on, and thus, the channel amplifier 123 may output the image signal SIG to a fourth pixel through the second data line DL2.

An order in which the first and second selection signals CLA and CLB are generated and an order in which the first and second switches SW1 and SW2 are driven may be varied.

Figure 8:
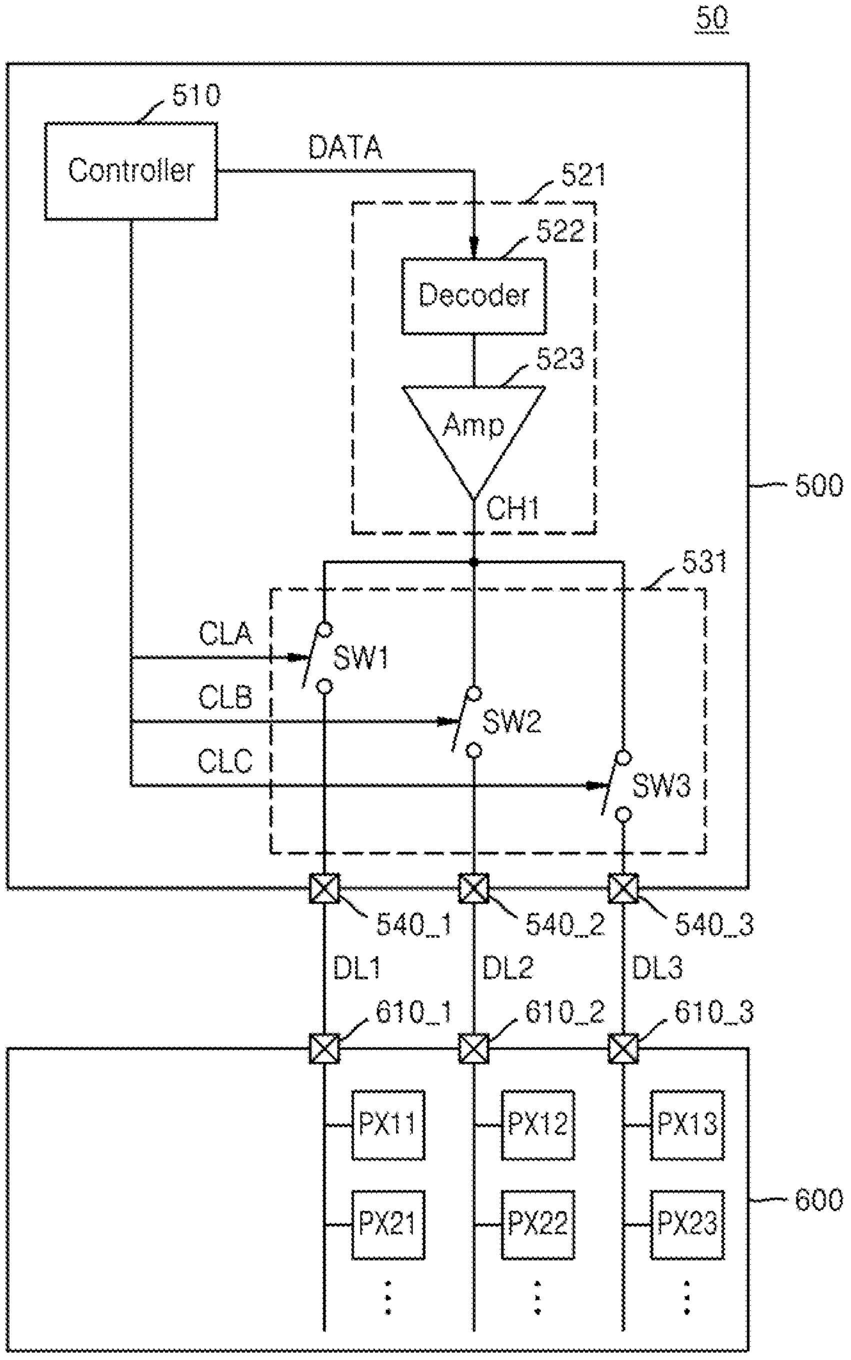
FIG. 8 is an example diagram illustrating a display apparatus according to an example embodiment.

FIG. 8 is an example diagram illustrating a display apparatus 50 according to an example embodiment. The display apparatus 50 of FIG. 8 may be similar to the display apparatuses 30, 31*a*, and 31*b* of FIGS. 3, 5, and 6, and thus, repeated descriptions thereof are omitted.

Referring to FIG. 8, a first multiplexer 531 may further include a third switch SW3. The third switch SW3 may be connected to a channel amplifier 523 and a third data line DL3, and thus, a first driving unit 521 of a data driver may drive first to third data lines DL1 to DL3. For example, the first driving unit 521 may sequentially drive the first to third data lines DL1 to DL3 in one horizontal period.

A controller 510 may generate first to third selection signals CLA, CLB, and CLC for respectively driving first to third switches SW1 to SW3. For example, the first to third selection signals CLA, CLB, and CLC may be sequentially generated in one horizontal period. The first to third selection signals CLA, CLB, and CLC may be within the first voltage range. Also, the first to third selection signals CLA, CLB, and CLC may be respectively provided to the first to third switches SW1 to SW3 in a state in which the first voltage range is maintained.

In operation of the first multiplexer 531, the first switch SW1 may be turned on by the first selection signal CLA to drive the first data line DL1. The second switch SW2 may be turned on by the second selection signal CLB to drive the second data line DL2. The third switch SW3 may be turned on by the third selection signal CLC to drive the third data line DL3.

The first multiplexer 531 may be connected to the first to third data lines DL1 to DL3 through first to third output pads 540_1 to 540_3. The display panel 600 may include first to third input pads 610_1 to 610_3.

As a data line is driven, the image signal SIG may be provided to the pixel group connected to the data line. For example, as the first data line DL1 is driven, first and second pixels PX11 and PX21 may be driven, as the second data line DL2 is driven, third and fourth pixels PX12 and PX22 may be driven, and as the third data line DL3 is driven, fifth and sixth pixels PX13 and PX23 may be driven. The first pixel PX11 (of the first pixel group), the third pixel PX12 (of the second pixel group), and the fifth pixel PX13 (of the third pixel group) may be driven in a first horizontal period H1. The second pixel PX21 (of the first pixel group), the fourth pixel PX22 (of the second pixel group), and the sixth pixel PX23 (of the third pixel group) may be driven in a second horizontal period H2.

A display panel 600 may have an RGB stripe structure, in which case the arrangement of the first to sixth pixels PX11, PX21, PX12, PX22, PX13, and PX23 may correspond to one of (R, R, G, G, B, B), (G, G, B, B, R, R), and (B, B, R, R, G, G).

The display driving circuit 500 may further include a second driving unit (not shown), fourth to sixth switches (not shown) connected to the second driving unit, a fourth data line (not shown) connecting a fourth switch to a fourth pixel group, a fifth data line (not shown) connecting a fifth switch to a fifth pixel group, and a sixth data line (not shown) connecting a sixth switch to a sixth pixel group. The fourth to sixth switches may be respectively driven by the first to third selection signals CLA, CLB, and CLC, and the first and fourth pixel groups may be driven in a division horizontal period where the first selection signal CLA is generated. Also, the second and fifth pixel groups may be driven in a division horizontal period where the second selection signal CLB is generated, and the third and sixth pixel groups may be driven in a division horizontal period where the third selection signal CLC is generated.

Figure 9:
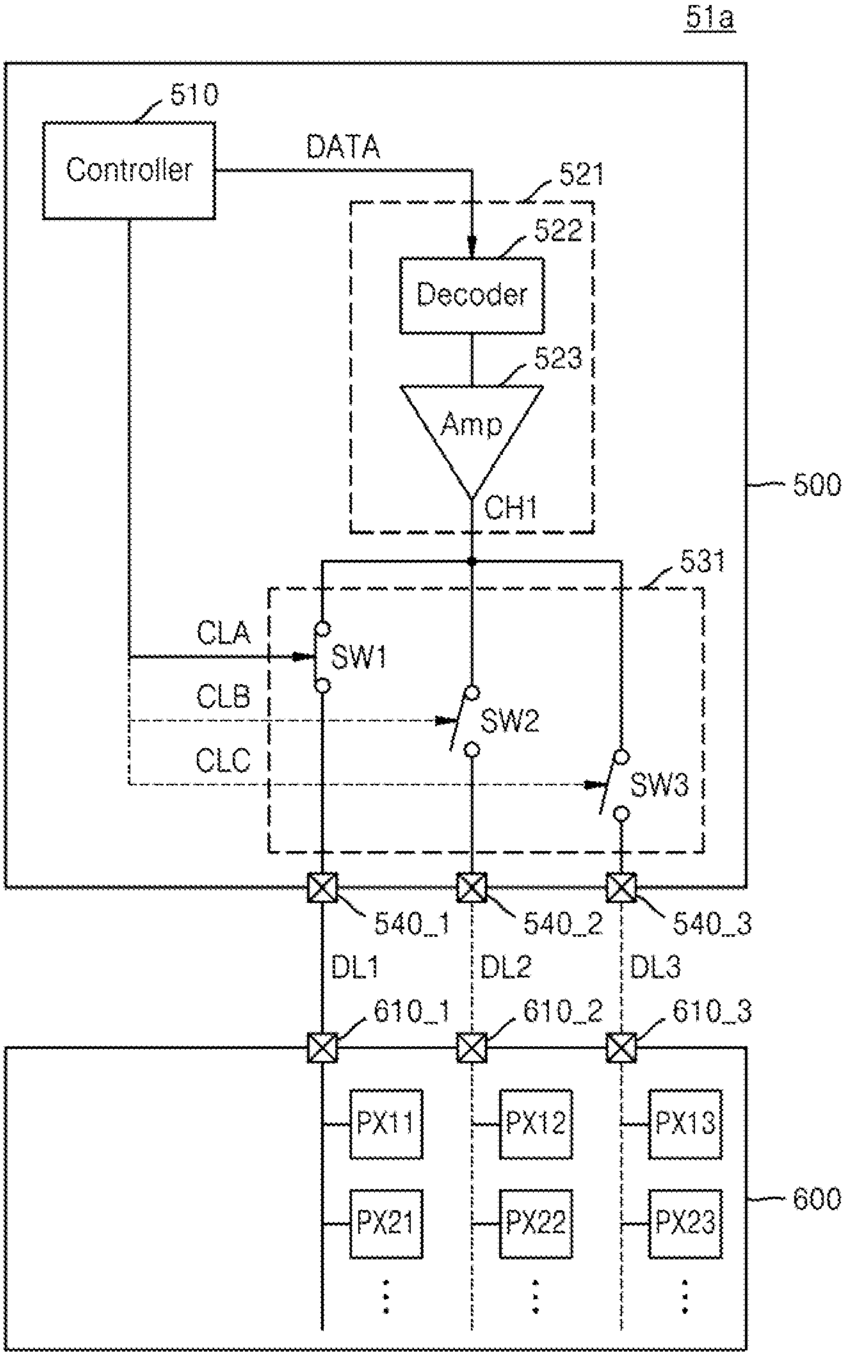
FIGS. 9 to 11 are example diagrams illustrating operation states of a display apparatus according to an example embodiment.
Figure 10:
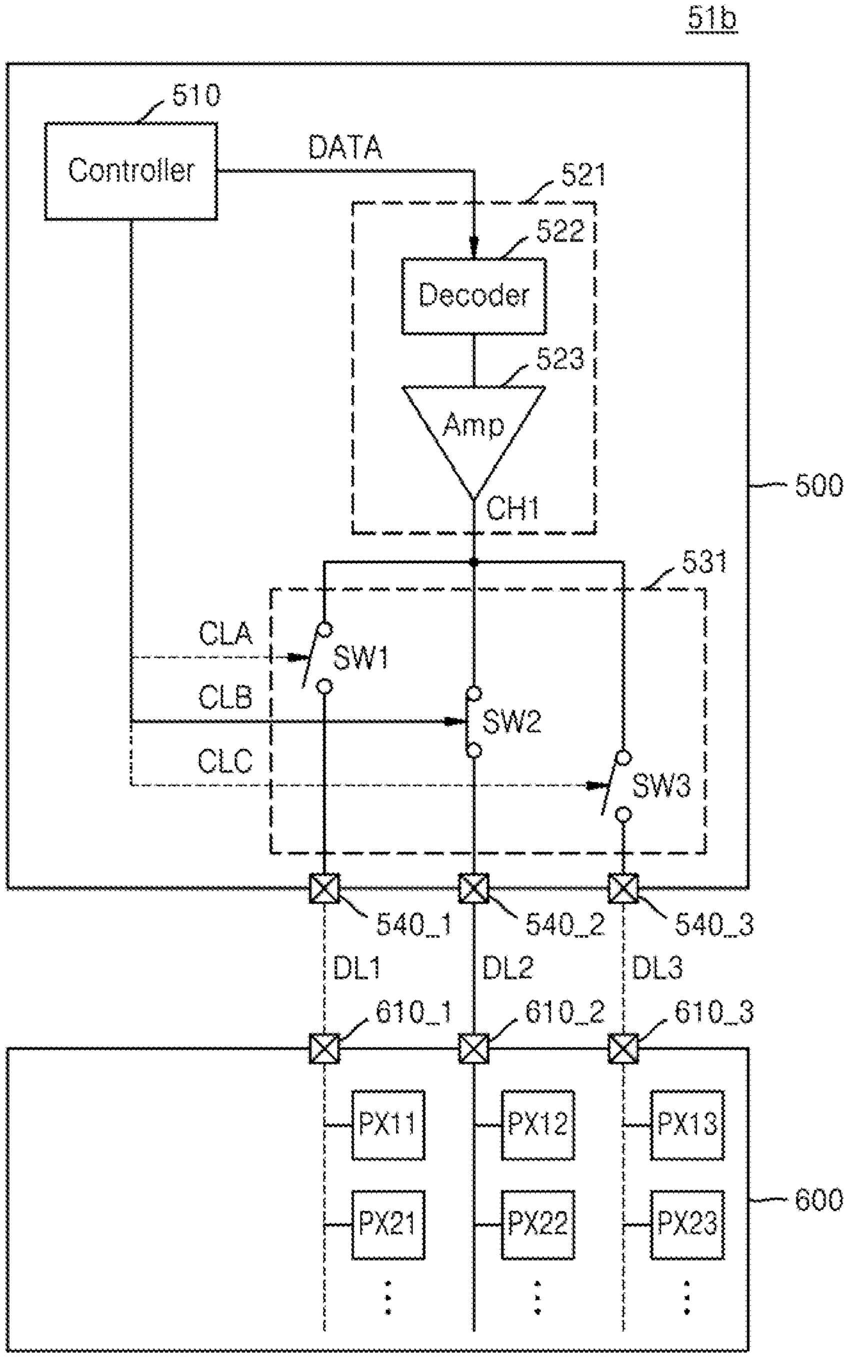
Figure 11:
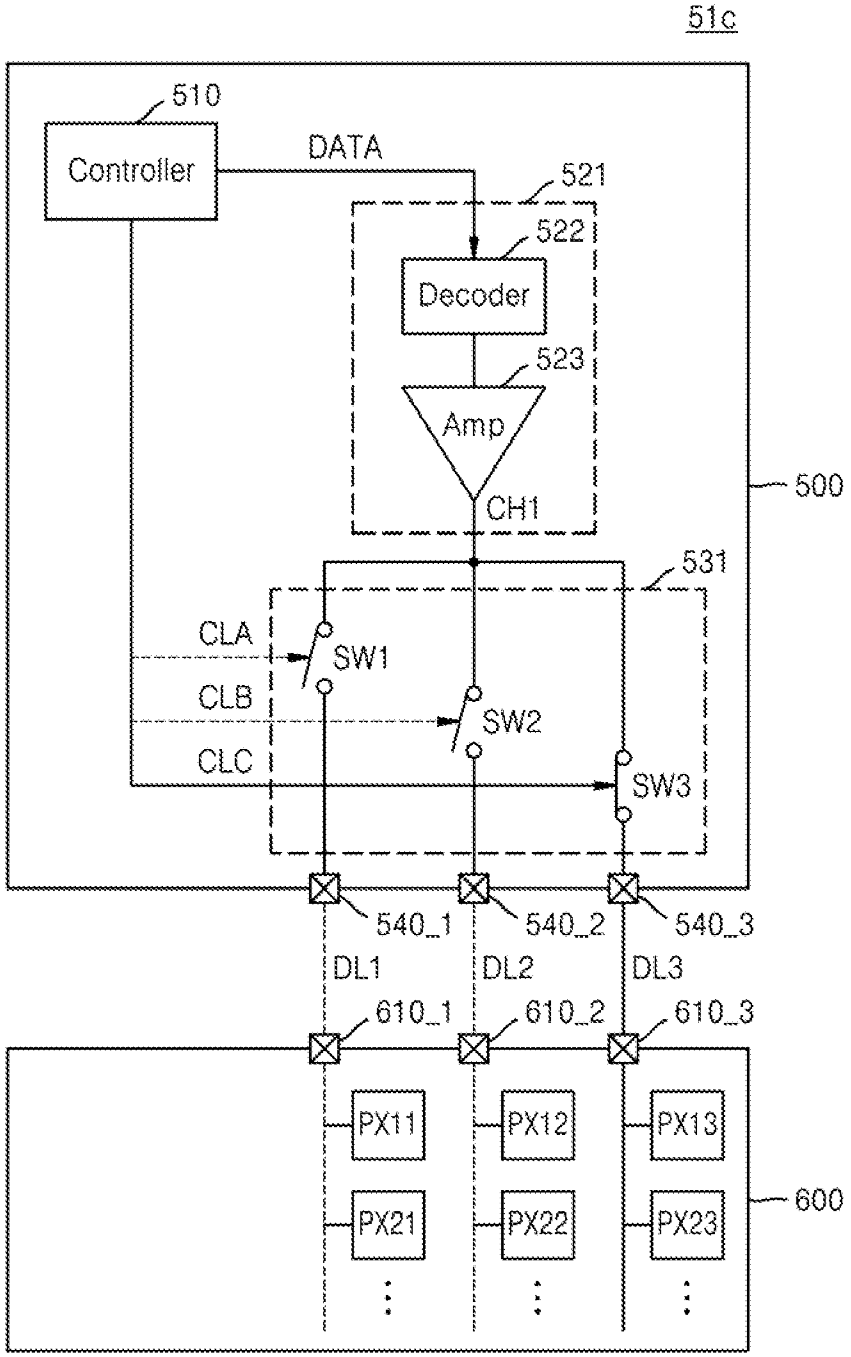
Figure 12:
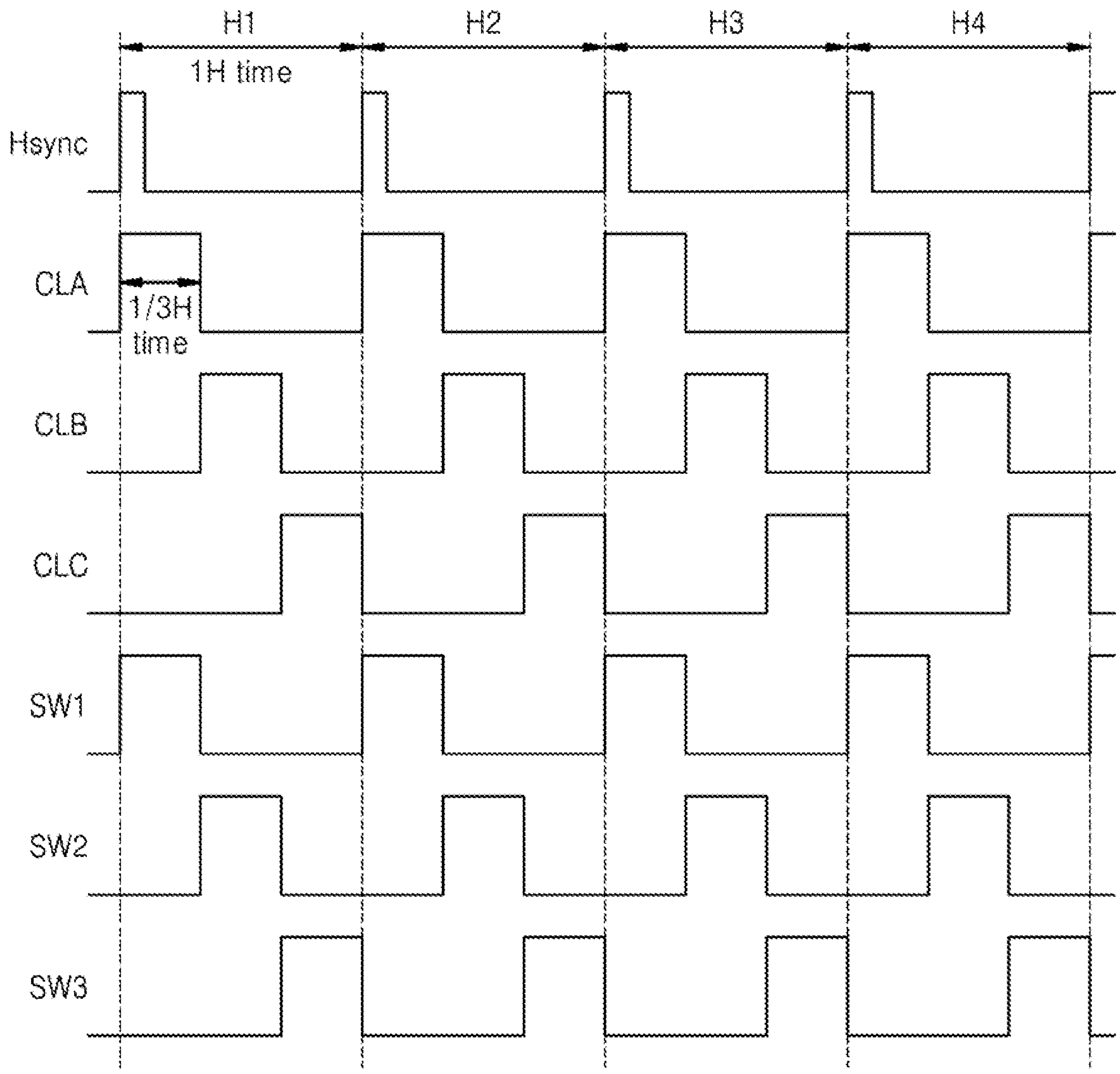
FIG. 12 is a timing diagram showing an operation of a data switching circuit according to an example embodiment.

FIGS. 9 to 11 are example diagrams illustrating operation states of a display apparatus according to an example embodiment, and FIG. 12 is a timing diagram showing an operation of a data switching circuit according to an example embodiment.

By way of example, a first horizontal period H1 may include first to third division horizontal periods, each ⅓H in duration.

By way of example, FIG. 9 illustrates a first operation state of a display apparatus (denoted 51*a*) in the first division horizontal period, FIG. 10 illustrates a second operation state of the display apparatus (denoted 51*b*) in the second division horizontal period, and FIG. 11 illustrates a third operation state of the display apparatus (denoted 51*c*) in the third division horizontal period.

Referring to FIGS. 9 and 12, a controller 510 may generate a first selection signal CLA in the first division horizontal period such that a first switch SW1 may be turned on by the first selection signal CLA. Therefore, a channel amplifier 523 of a first driving unit 521 may output an image signal SIG to a first data line DL1. A first pixel group (including a first pixel PX11 and a second pixel PX21) may be activated based on driving of the first data line DL1. For example, the first pixel PX11 of the first pixel group may receive the image signal SIG and may be driven based on the image signal SIG.

Referring to FIGS. 10 and 12, the controller 510 may generate a second selection signal CLB in the second division horizontal period such that a second switch SW2 may be turned on by the second selection signal CLB. Therefore, the channel amplifier 523 of the first driving unit 521 may output the image signal SIG to a second data line DL2. A second pixel group (including a third pixel PX12 and a fourth pixel PX22) may be activated based on driving of the second data line DL2. For example, the third pixel PX12 of the second pixel group may receive the image signal SIG and may be driven based on the image signal SIG.

Referring to FIGS. 11 and 12, the controller 510 may generate a third selection signal CLC in the third division horizontal period such that a third switch SW3 may be turned on by the third selection signal CLC. Therefore, the channel amplifier 523 of the first driving unit 521 may output the image signal SIG to a third data line DL3. A third pixel group (including a fifth pixel PX13 and a sixth pixel PX23) may be activated based on driving of the third data line DL3. For example, the fifth pixel PX13 of the third pixel group may receive the image signal SIG and may be driven based on the image signal SIG.

Referring to FIG. 12, operations described above may be periodically performed in first to fourth horizontal periods H1 to H4.

For example, the second horizontal period H2 may be divided into fourth to sixth division horizontal periods. In the fourth division horizontal period, the first selection signal CLA may be turned on, and thus, the channel amplifier 523 may output the image signal SIG to the second pixel PX21 through the first data line DL1. In the fifth division horizontal period, the second selection signal CLB may be turned on, and thus, the channel amplifier 523 may output the image signal SIG to the fourth pixel PX22 through the second data line DL2. In the sixth division horizontal period, the third selection signal CLC may be turned on, and thus, the channel amplifier 523 may output the image signal SIG to the sixth pixel PX23 through the third data line DL3.

An order in which the first to third selection signals CLA, CLB, and CLC are generated and an order in which the first to third switches SW1 to SW3 are driven may be varied.

Figure 13:
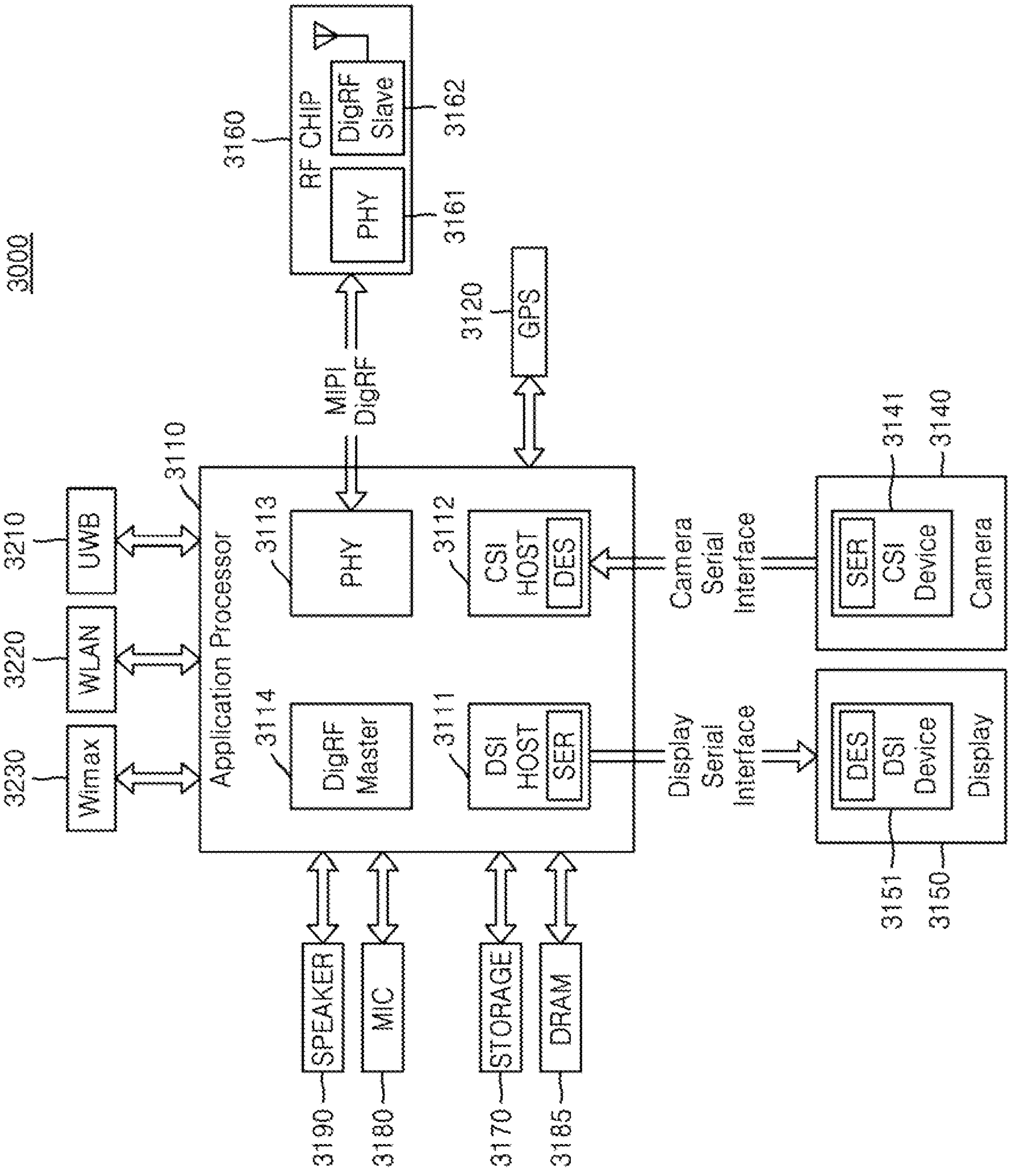
FIG. 13 is a block diagram of an electronic system including a display apparatus according to an example embodiment.

FIG. 13 is a block diagram of an electronic system 3000 including a display apparatus according to an example embodiment.

Referring to FIG. 13, the electronic system 3000 may be implemented as a data processing device, e.g., a mobile terminal, a PDA, a PMP, a smartphone, or the like, which may be capable of using or supporting an MIPI interface.

The electronic system 3000 may include an application processor 3110, an image sensor 3140, and a display apparatus 3150.

The display apparatus 3150 may be the display apparatus 10, 20, 30, or 50 according to the embodiments described above. Therefore, the display apparatus 3150 may include a display driving circuit (not shown) which time-divisionally drives a plurality of pixel groups in one horizontal period of a display panel (not shown).

A camera serial interface (CSI) host 3112 equipped in the application processor 3110 may perform serial communication with a CSI device 3141 of the image sensor 3140 through a CSI. In this case, e.g., a light deserializer may be implemented in the CSI host 3112, and a light serializer may be implemented in the CSI device 3141.

A display serial interface (DSI) host 3111 implemented in the application processor 3110 may perform serial communication with a DSI device 3151 of the display apparatus 3150 through a DSI. In this case, e.g., a light serializer may be implemented in the DSI host 3111, and a light deserializer may be implemented in the DSI device 3151.

The electronic system 3000 may include a radio frequency (RF) chip 3160 capable of communicating with the application processor 3110. A physical layer (PHY) 3113 of the electronic system 3000 and a PHY 3161 of the RF chip 3160 may exchange data according to MIPI DigRF.

The electronic system 3000 may include a global positioning system (GPS) 3120, a storage 3170, a microphone 3180, a dynamic random access memory (DRAM) 3185, and a speaker 3190. The electronic system 3000 may perform communication by using Wimax 3230, a wireless local area network (WLAN) 3220, and ultra-wideband (UWB) 3210.

As described above, embodiments may provide a display apparatus which includes a switch connected to a data line and includes a display panel and a display driving circuit time-divisionally driving a plurality of pixel groups.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display driving circuit comprising:

a controller configured to time-divisionally generate a first selection signal and a second selection signal corresponding to a plurality of voltage ranges;

a data switching circuit configured to receive the first selection signal and the second selection signal and provide an image signal;

the data switching circuit further configured to turn on a first switch during a first period in response to the first selection signal and a second switch during a second period in response to the second selection signal, a data driver including a plurality of driving units and configured to generate the image signal on the basis of image data from the controller; and a plurality of output pads for connecting to a plurality of pixel groups through a plurality of data lines, wherein the first selection signal and the second selection signal are within a first voltage range, and wherein the first switch and the second switch are connected to one of the driving units and to a first and second output pad of the plurality of output pads, respectively.

2. The display driving circuit as claimed in claim 1, wherein:

the plurality of data lines includes a first data line and a second data line, and the plurality of pixel groups includes a first pixel group and a second pixel group.

3. The display driving circuit as claimed in claim 1, wherein the plurality of driving units are configured to transfer the image signal to the plurality of data lines in the first period and the second period.

4. The display driving circuit as claimed in claim 3, wherein the data driver is configured to drive the plurality of data lines when the first switch and second switch are sequentially turned on by the first and second selection signals.

5. The display driving circuit as claimed in claim 1, wherein the controller is configured to determine a driving order of each of the plurality of pixel groups.

6. The display driving circuit as claimed in claim 5, wherein the controller is configured to generate the first selection signal for driving a first pixel group of the plurality of pixel groups in the first period and to generate the second selection signal for driving a second pixel group of the plurality of pixel groups in the second period.

7. The display driving circuit as claimed in claim 1, wherein the plurality of data lines are sequentially driven within the first period and the second period.

8. The display driving circuit as claimed in claim 1, wherein the number of output pads is the same as the number of pixel groups.

9. A method of operating a display driving circuit comprising:

generating time-divisionally a first selection signal and a second selection signal corresponding to a plurality of voltage ranges;

receiving the first selection signal and the second selection signal and providing an image signal, wherein the receiving the first selection signal and the second selection signal includes turning on a first switch during a first period in response to the first selection signal and a second switch during a second period in response to the second selection signal, wherein the first selection signal and the second selection signal are within a first voltage range, and wherein the first switch and the second switch are connected to a driving unit and are each connected to a respective output pad.

10. A method of operating a display driving circuit as claimed in claim 9, further comprising:

generating the image signal based on image data; and connecting each of a plurality of pixel groups to receive the image signal through a plurality of data lines.

11. A method of operating a display driving circuit as claimed in claim 10, wherein:

the plurality of data lines includes a first set of data lines that receive the first selection signal and a second set of data lines that receive the second selection signal, and the plurality of pixel groups includes a first set of pixel groups connected to the first set of data lines and a second set of pixel groups connected to the second set of data lines.

12. A method of operating a display driving circuit as claimed in claim 10, wherein the connecting each of the plurality of pixel groups to receive the image signal through a plurality of data lines includes determining a driving order of each of the plurality of pixel groups.

13. A method of operating a display driving circuit as claimed in claim 12, wherein the first selection signal is generated for driving a first pixel group of the plurality of pixel groups in the first period and the second selection signal is generated for driving a second pixel group of the plurality of pixel groups in the second period.

14. A method of operating a display driving circuit as claimed in claim 10, wherein the plurality of data lines are sequentially driven within the first period and the second period.

15. A method of operating a display driving circuit as claimed in claim 14, wherein the number of output pads of the display driving circuit is the same as the number of pixel groups.

16. A method of operating a display driving circuit as claimed in claim 9, wherein the image signal is transferred to a plurality of data lines in the first period and the second period.

17. A method of operating a display driving circuit as claimed in claim 16, wherein the plurality of data lines are sequentially driven as the first switch and the second switch are sequentially turned on by the first selection signal and the second selection signal.

* * * * *